(12) United States Patent
Okazaki et al.

(10) Patent No.: US 9,839,960 B2
(45) Date of Patent: Dec. 12, 2017

(54) THREE DIMENSIONAL PRINTER

(71) Applicant: Sodick Co., Ltd., Kanagawa (JP)

(72) Inventors: Shuji Okazaki, Kanagawa (JP);
Shuichi Kawada, Kanagawa (JP);
Katsutaka Muranaka, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 182 days.

(21) Appl. No.: 14/830,413

(22) Filed: Aug. 19, 2015

(65) Prior Publication Data

US 2016/0107229 A1  Apr. 21, 2016

(30) Foreign Application Priority Data

Oct. 21, 2014   (JP) ................................ 2014-214394

(51) Int. Cl.
| | | |
|---|---|---|
| *B29C 67/00* | (2017.01) | |
| *B22F 3/00* | (2006.01) | |
| *B33Y 30/00* | (2015.01) | |
| *B33Y 10/00* | (2015.01) | |

(52) U.S. Cl.
CPC .......... *B22F 3/008* (2013.01); *B29C 67/0077* (2013.01); *B29C 67/0085* (2013.01); *B33Y 10/00* (2014.12); *B33Y 30/00* (2014.12)

(58) Field of Classification Search
CPC ............ B29C 67/0051; B29C 67/0077; B29C 67/0088; B33Y 30/00; B33Y 40/00; B33Y 50/02
USPC .............................................. 425/174.4, 375
See application file for complete search history.

(56) References Cited

U.S. PATENT DOCUMENTS

| | | | |
|---|---|---|---|
| 7,537,722 B2 * | 5/2009 | Andersson .......... | B29C 67/0077 425/174.4 |
| 2005/0116391 A1 | 6/2005 | Lindemann et al. | |
| 2011/0256253 A1 | 10/2011 | Amaya et al. | |
| 2013/0108726 A1 * | 5/2013 | Uckelmann ......... | B29C 67/0007 425/375 |

FOREIGN PATENT DOCUMENTS

| | | |
|---|---|---|
| JP | 2002-103894 A | 4/2002 |
| JP | 2003245981 A | 2/2003 |
| JP | 2005089863 A | 7/2005 |
| JP | 2011218744 B1 | 11/2011 |

OTHER PUBLICATIONS

Japanese Office Action dated Sep. 24, 2015, in connection with corresponding JP Application No. 2014-214394 (14 pgs.).
Japanese Office Action dated May 22, 2015 from corresponding Japanese Application No. 2014-214394; 6 pgs.

* cited by examiner

*Primary Examiner* — Joseph S Del Sole
*Assistant Examiner* — Thukhanh T Nguyen
(74) *Attorney, Agent, or Firm* — Maier & Maier, PLLC

(57) ABSTRACT

A lamination molding apparatus which can improve the lamination molding accuracy, is provided. A lamination molding apparatus, including a chamber covering a desired molding region, the chamber being filled with an inert gas of a predetermined concentration; and a molding table provided in the molding region, the molding table being configured so as to be capable of being moved vertically by a driving mechanism; wherein the molding table is configured to be temperature-controllable; and a thermostatic section is provided in between the molding table and the driving mechanism or in the driving mechanism, temperature of the thermostatic section being maintained substantially constant, is provided.

6 Claims, 13 Drawing Sheets

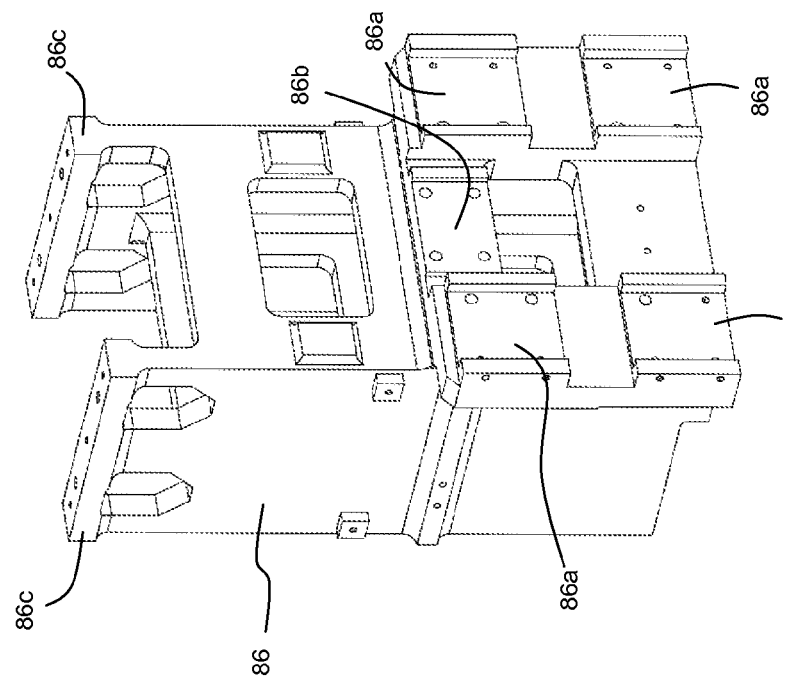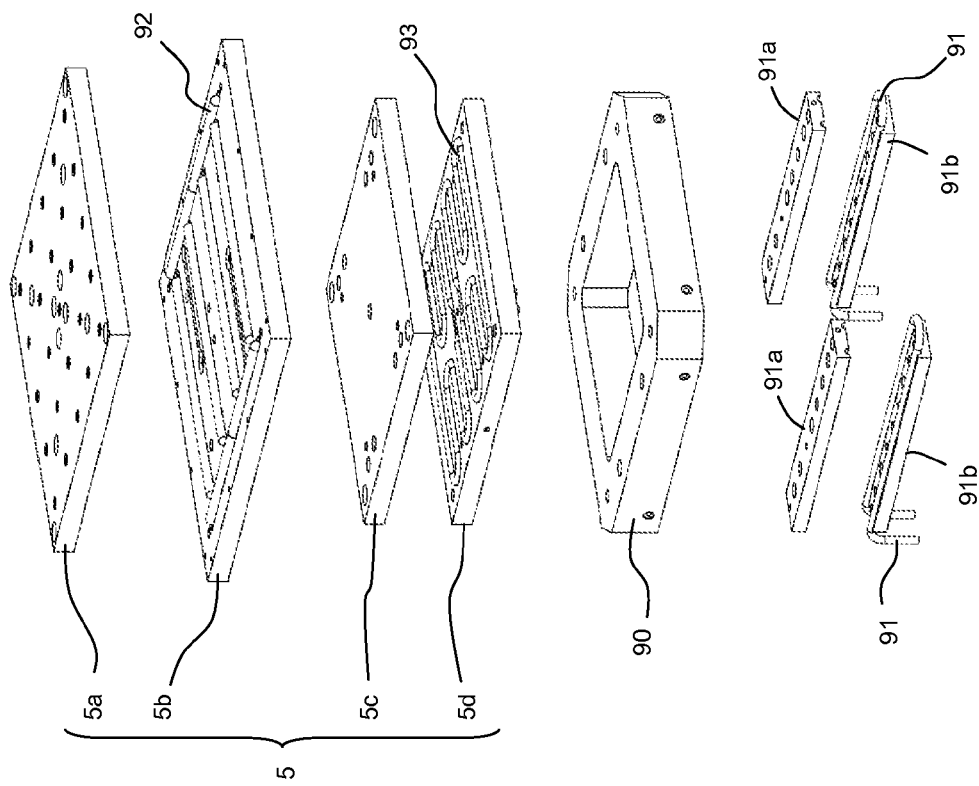
Fig. 9

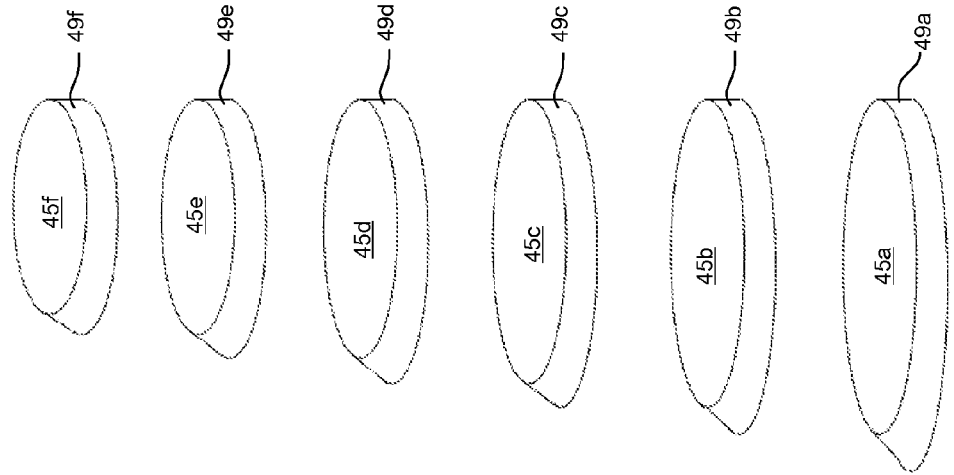
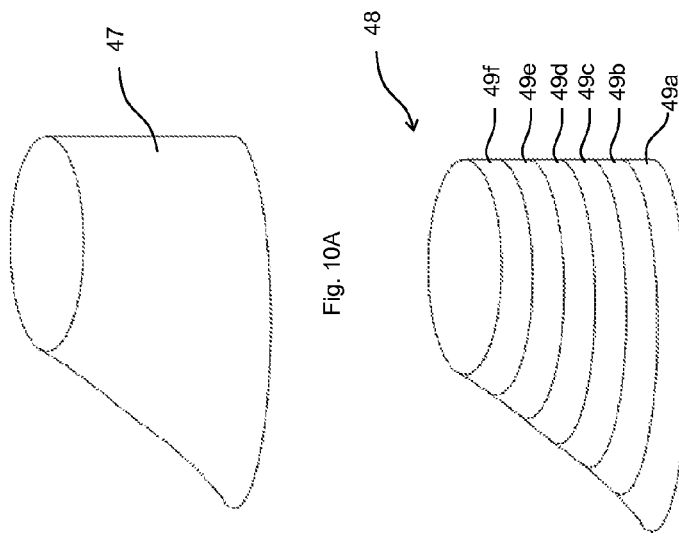
Fig. 10A
Fig. 10B
Fig. 10C

THREE DIMENSIONAL PRINTER

BACKGROUND OF THE INVENTION

Field of the Invention

The present invention relates to a lamination molding device.

Background of the Invention

In a lamination molding method (laser lithography) of metal using laser beam, a molding plate is mounted on a molding table, the molding table being arranged in a chamber filled with nitrogen gas and being capable of vertical movement. Then, a very thin material powder layer is formed so as to cover the molding plate. Predetermined portions of this material powder layer are irradiated with the laser beam to sinter the material powder at the position of irradiation. These procedures are repeated to form a desired molded product on the molding plate.

In general, the temperature of the molding table need be raised to temperatures in the range of 50 to 150° C. (differs depending on the powder material) in order to sinter the metal powder to have a predetermined hardness and density. When the molding plate is set on the molding table, the molding table need be at ambient temperature. Accordingly, the temperature of the molding table need be raised to the predetermined temperature as soon as possible in order to shorten the time for setups. In addition, the molding table need be cooled after the lamination molding in order to take the molded product in hand as soon as possible after the molding. However, such temperature change can cause thermal deformation in the driving mechanism of the molding table, affecting the accuracy in the lamination molding of the molded product. Further, since the molding period generally requires more than several tens of hours, the heat during molding may transfer from the molding table to the driving mechanism via the material powder. Even the heat transferred as such can affect the accuracy in the lamination molding of the molded product.

The technique disclosed in Patent Literature 1 provides a base stage over a table which can move vertically, in order to effectively heat and cool the molding table. Here, the base stage supports a cooling pipe or a heat pipe. A base plate is provided on the base stage, and a space or a heat insulator is provided in between the base stage and the table.

PRIOR ART DOCUMENTS

Patent Literature

[Patent Literature 1] JP 4566286B

SUMMARY OF INVENTION

Technical Problem

The heat transfer from the cooling pipe or the heat pipe to the driving mechanism of the table can be suppressed to a certain level by the constitution of Patent Literature 1, however, the thermal displacement of the driving mechanism could not be controlled at a satisfying level. Accordingly, it was difficult to sufficiently improve the lamination molding accuracy.

The present invention has been made by taking these circumstances into consideration. An object of the present invention is to provide a lamination molding apparatus which can improve the lamination molding accuracy.

Means to Solve the Problem

According to the present invention, a lamination molding apparatus, comprising: a chamber covering a desired molding region, the chamber being filled with an inert gas of a predetermined concentration; and a molding table provided in the molding region, the molding table being configured so as to be capable of being moved vertically by a driving mechanism; wherein the molding table is configured to be temperature-controllable; and a thermostatic section is provided in between the molding table and the driving mechanism or in the driving mechanism, temperature of the thermostatic section being maintained substantially constant, is provided.

Effect of the Invention

The lamination molding apparatus of the present invention is provided with a thermostatic section in between the molding table and the driving mechanism or in the driving mechanism. The temperature of the thermostatic section is maintained substantially constant. The thermostatic section is controlled so as to maintain the temperature of the thermostatic section substantially constant, regardless of whether the molding table is being heated or cooled. By providing such thermostatic section in between the molding table and the driving mechanism or in the driving mechanism, the thermal deformation of the driving mechanism due to the heat from the molding table can be suppressed, thereby improving the lamination molding accuracy.

Hereinafter, various embodiments of the present invention will be provided. The embodiments provided below can be combined with each other.

Preferably, the driving mechanism comprises a guide base; and a slide base capable of moving vertically with respect to the guide base, the slide base being provided below the molding table; and the thermostatic section is provided in between the molding table and the slide base.

Preferably, the molding table comprises a top plate; and a temperature control section provided below the top plate, the temperature control section being capable of controlling a temperature of the top plate; and the thermostatic section is provided in between the temperature control section and the slide base.

Preferably, the temperature control section comprises a heater provided below the top plate, the heater being capable of heating the top plate; and a cooler provided below the heater, the cooler being capable of cooling the top plate; and the thermostatic section is provided below the cooler.

Preferably, a heat insulating plate is provided in between the thermostatic section and the molding table.

Preferably, the lamination molding apparatus further comprises: a powder retaining wall surrounding the molding table and maintaining a material powder to be supplied onto the molding table; wherein the driving mechanism comprises a guide base; and a slide base capable of moving vertically with respect to the guide base, the slide base being provided below the molding table; the guide base is connected directly to the powder retaining wall or is connected to the powder retaining wall via a connecting member; and the thermostatic section is provided to the guide base or to the connecting member.

Preferably, the thermostatic section is structured with a pipe and a medium flowing through the pipe, the medium having a substantially constant temperature.

Preferably, the driving mechanism comprises a guide base; a slide base capable of moving vertically with respect to the guide base; and a screw feeding mechanism comprising a screw shaft supported by the guide base and a nut member fixed onto the slide base and screwed to the screw shaft 88, the screw feeding mechanism being provided in between the guide base and the slide base.

Preferably, the thermostatic section is provided in between the molding table and the driving mechanism, and outside of the slide base of the driving mechanism or outside of the guide base or inside the slide base of the driving mechanism. Preferably, the lamination molding apparatus comprises a powder retaining wall surrounding the molding table and maintaining a material powder to be supplied onto the molding table; wherein the guide base is connected to the powder retaining wall via a connecting member, and the thermostatic section is further provided to the connecting member.

BRIEF DESCRIPTION OF THE DRAWINGS

The above further objects, features and advantages of the present invention will become more apparent from the following detailed description taken in conjunction with the accompanying drawings, wherein:

FIG. 9 is an exploded perspective view of the slide base 86 and the molding table 5 of FIG. 7.

FIG. 10A is a perspective view of the molded product 47 having a desired profile.

FIG. 10B is a perspective view of the model 48 of the molded product of FIG. 10A.

FIG. 10C is a perspective view showing the model 48 of FIG. 10B sliced by a horizontal plane at a predetermined unit height.

DESCRIPTION OF THE PREFERRED EMBODIMENTS

Hereinafter, the embodiments of the present invention will be described with reference to the drawings. Here, the characteristic matters shown in the embodiments can be combined with each other.

Figure 1:
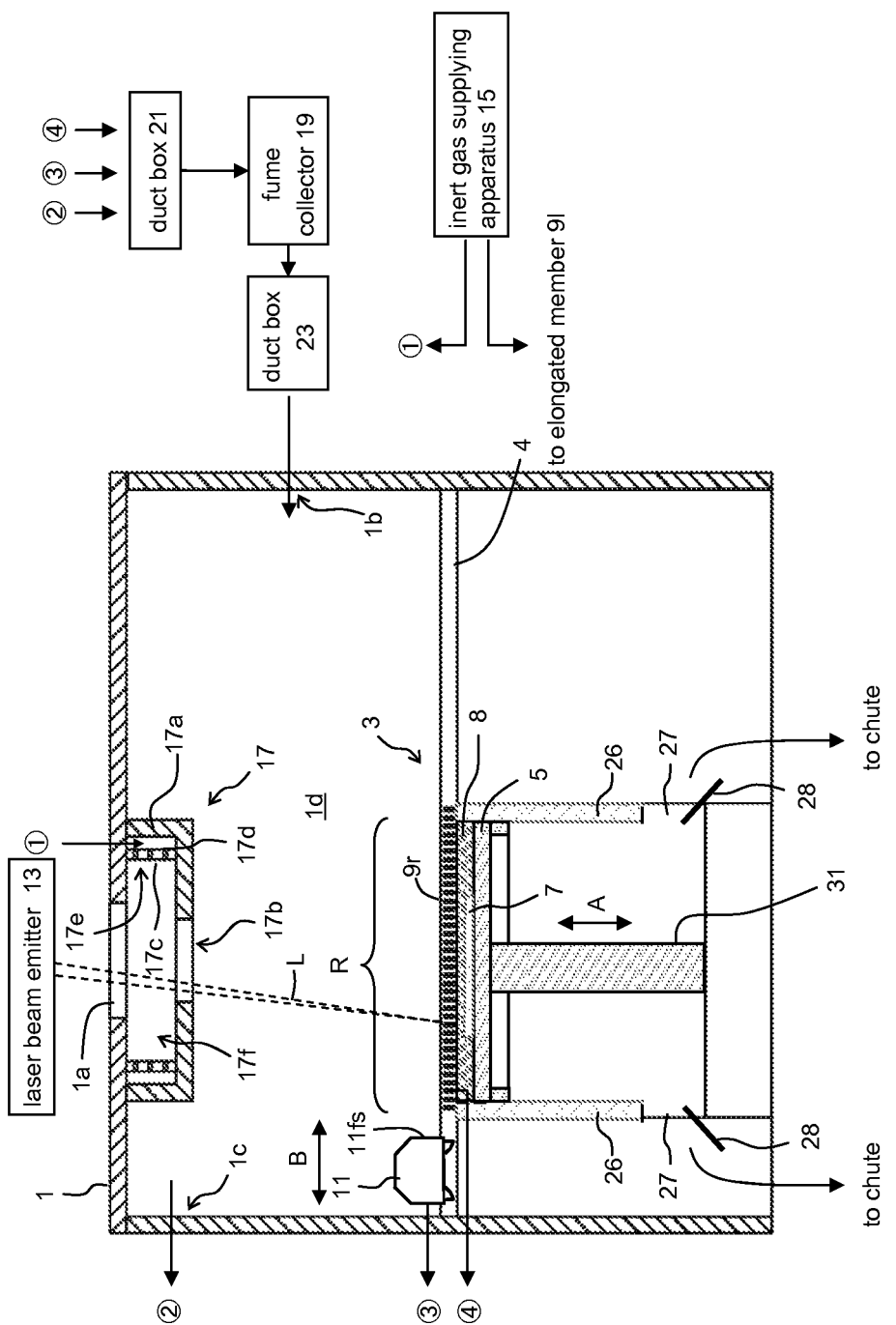
FIG. 1 is a rough structural diagram of the lamination molding apparatus according to one embodiment of the present invention.

As shown in FIG. 1, the lamination molding apparatus according to one embodiment of the present invention comprises a chamber 1 covering a desired molding region R and being filled with an inert gas of predetermined concentration; a recoater head 11 forming a material powder layer 8 by supplying the material powder onto a molding region R while moving in the chamber 1; and a laser beam emitter 13 sintering the material powder by irradiating a desired portion of the material powder layer 8 with a laser beam L to sinter the material powder at the position of irradiation.

In the chamber 1, a powder layer forming apparatus 3 is provided. The powder layer forming apparatus 3 comprises a base 4 having a molding region R, a recoater head 11 provided on the base 4 and being capable of moving in a horizontal uniaxial direction (direction shown by arrow B), and elongated members 9r and 9l provided on both sides of the molding region R along the moving direction of the recoater head 11. The molding region R is provided with a molding table 5 capable of moving vertically (direction shown by arrow A in FIG. 1). Here, a driving mechanism 31 drives the molding table 5. When the lamination molding apparatus is used, the molding plate 7 is arranged on the molding table 5, and the material powder layer 8 is formed on the molding table 5.

A powder retaining wall 26 is provided so as to surround the molding table 5, and the non-sintered powder material is retained in a powder retaining space 32 surrounded by the powder retaining wall 26 and the molding table 5. Below the powder retaining wall 26, a powder discharging section 27 capable of discharging the material powder retained in the powder retaining space 32 is provided. After the lamination molding is completed, the molding table 5 is descended, thereby discharging the non-sintered material powder from the powder discharging section 27. The material powder discharged is guided to a chute by a chute guide 28, and then the material powder in the chute is allowed to be contained in a bucket (both of them not shown).

Figure 2:
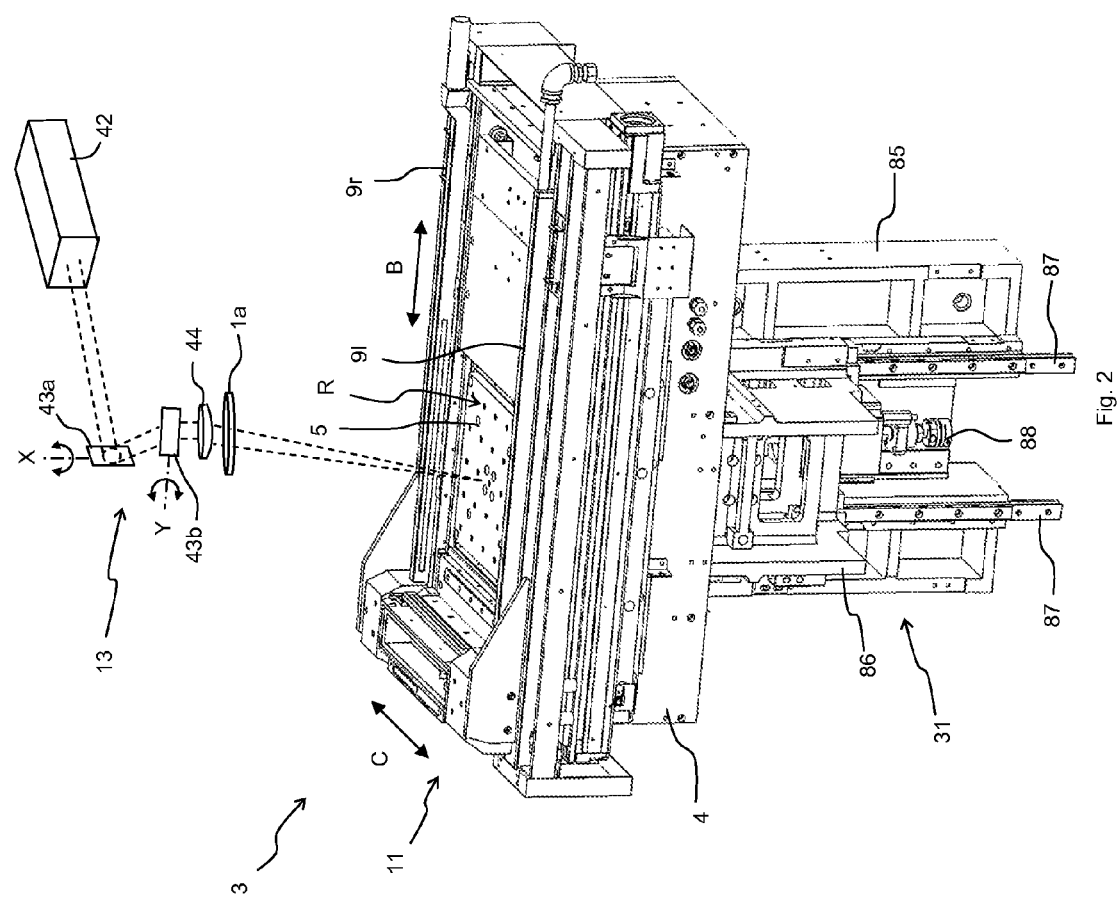
FIG. 2 is a perspective view of the powder layer forming apparatus 3 and the laser beam emitter 13.
Figure 3:
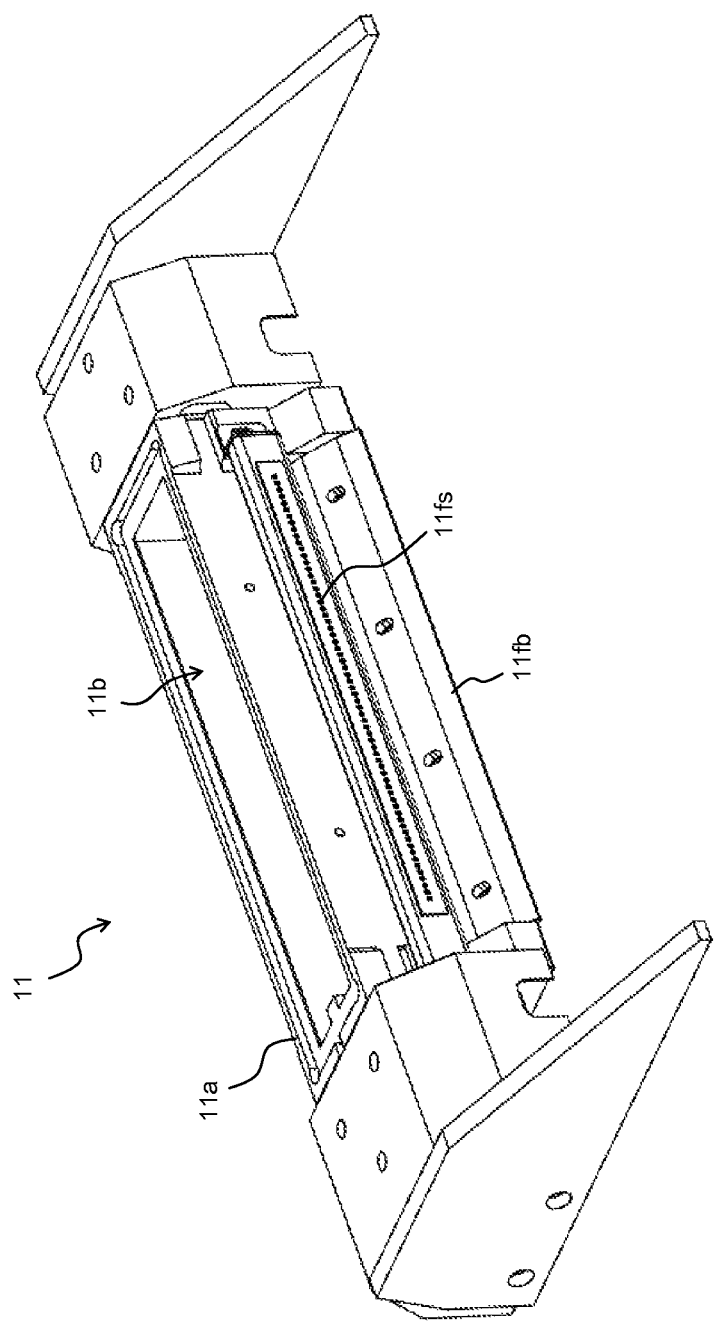
FIG. 3 is a perspective view of the recoater head 11.
Figure 4:
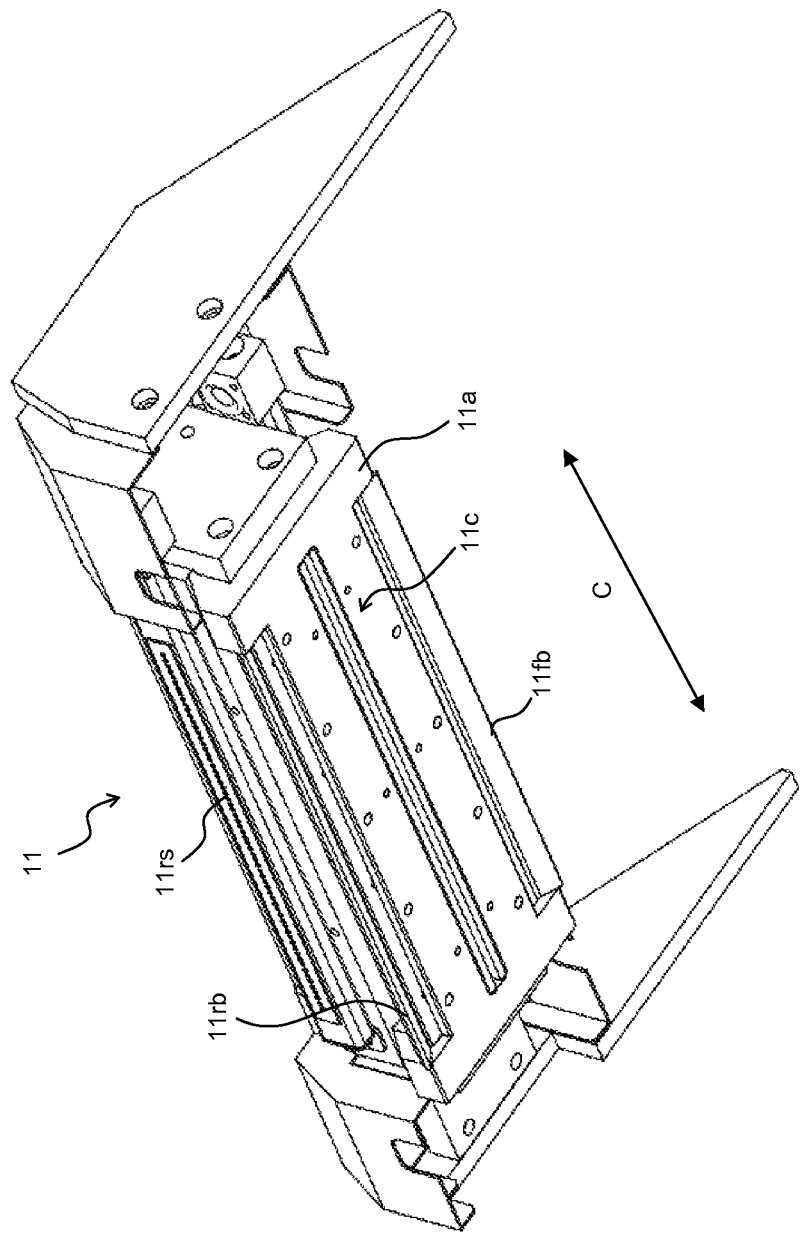
FIG. 4 is a perspective view of the recoater head 11 observed from another angle.

As shown in FIGS. 2 to 4, the recoater head 11 comprises a material holding section 11a, an upper opening 11b provided on the top surface of the material holding section 11a, and a material discharging opening 11c provided on the bottom surface of the material holding section 11a for discharging the material powder contained in the material holding section 11a. The material discharging opening 11c has a slim slit shape which elongates in the horizontal uniaxial direction (direction shown by arrow C) crossing orthogonally with the moving direction (direction shown by arrow B) of the recoater head 11. On both sides of the recoater head 11, squeegee blades 11fb and 11rb for forming a material powder layer 8 by planarizing the material powder discharged from the material discharging opening 11c are provided. In addition, on both sides of the recoater head 11, fume suction sections 11fs and 11rs for suctioning the fume generated during sintering of the material powder are provided. The fume suction sections 11fs and 11rs are provided along the horizontal uniaxial direction (direction shown by arrow C) crossing orthogonally with the moving direction (direction shown by arrow B) of the recoater head 11. The material powder is, for example, metal powder (iron powder for example) having a sphere shape with an average particle diameter of 20 μm.

The elongated members 9r and 9l are provided with openings. Here, the openings are provided along the moving direction (direction shown by arrow B) of the recoater head 11. One of these openings is used as the inert gas supplying opening, and the other is used as the inert gas discharging opening, thereby forming a flow of the inert gas in the direction shown by arrow C on the molding region R. Accordingly, the fume generated in the molding region R can be easily discharged along this flow of inert gas. Here, in the present specification, "inert gas" is a gas which substantially does not react with the material powder, and nitrogen gas, argon gas, and helium gas can be mentioned for example.

A laser beam emitter 13 is provided above the chamber 1. As shown in FIG. 2, the laser beam emitter 13 comprises a laser source 42 to emit the laser beam L, a pair of galvanometer scanners 43a and 43b to perform two dimensional scanning of the laser beam L emitted from the laser source 42, and a condensing lens 44 to condense the laser beam L. The galvanometer scanner (X-axis scanner) 43a scans the laser beam L in the direction shown by arrow B (X-axis direction), and the galvanometer scanner (Y-axis scanner) 43b scans the laser beam L in the direction shown by arrow C (Y-axis direction). Each of the scanners 43a and 43b is controlled of its rotation angle depending on the size of the rotation angle controlling signal. Accordingly, the position irradiated by the laser beam L can be moved to a desired position by altering the size of the rotation angle controlling signal being input to the scanners 43a and 43b. An example of the condensing lens 44 is fθ lens.

The laser beam L which passed through the condensing lens 44 further passes through the window la provided to the chamber 1. Then, the material powder layer 8 formed in the molding region R is irradiated with the laser beam L. The type of the laser beam L is not limited so long as it can sinter the material powder. For example, $CO_2$ laser, fiber laser, YAG laser and the like can be used. The window la is formed with a material capable of transmitting the laser beam L. For example, in a case where the laser beam L is fiber laser or YAG laser, the window la can be structured with a quartz glass.

On the upper surface of the chamber 1, the fume adhesion preventing section 17 is provided so as to cover the window 1a. The adhesion preventing section 17 is provided with a cylindrical housing 17a and a cylindrical diffusing member 17c arranged in the housing 17a. An inert gas supplying space 17d is provided in between the housing 17a and the diffusing member 17c. Further, on the bottom surface of the housing 17a, an opening 17b is provided at the inner portion of the diffusing member 17c. The diffusing member 17c is provided with a plurality of pores 17e, and the clean inert gas supplied into the inert gas supplying space 17d is filled into a clean space 17f through the pores 17e. Then, the clean inert gas filled in the clean space 17f is discharged towards below the fume adhesion preventing section 17 through the opening 17b.

As shown in FIG. 2, the driving mechanism 31 comprises a guide base 85, and a slide base 86 capable of being driven vertically with respect to the guide base 85 and being arranged below the molding table 5. The guide base 85 is provided with a slide mechanism 87 and a screw feeding mechanism 88.

Figure 5:
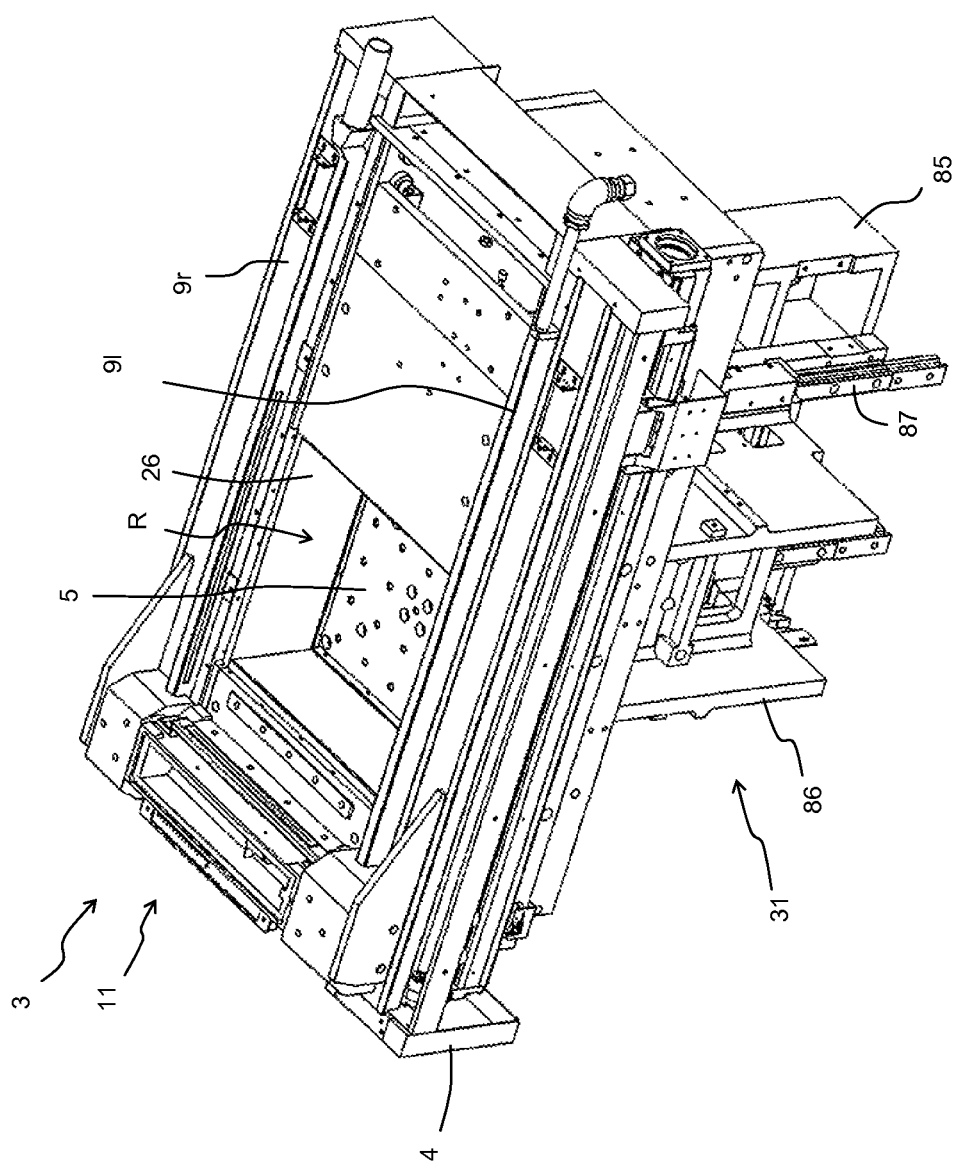
FIG. 5 is a perspective view of the powder layer forming apparatus 3 of FIG. 2, where the position of the molding table 5 is descended.
Figure 6:
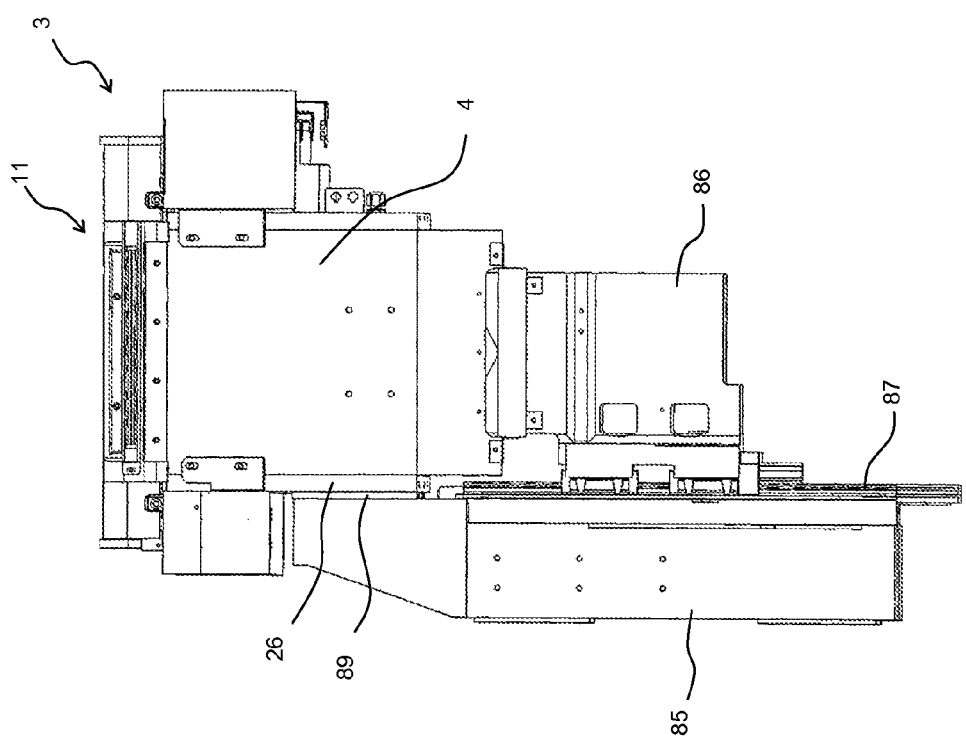
FIG. 6 is a perspective view of FIG. 5 observed from another angle.
Figure 7:
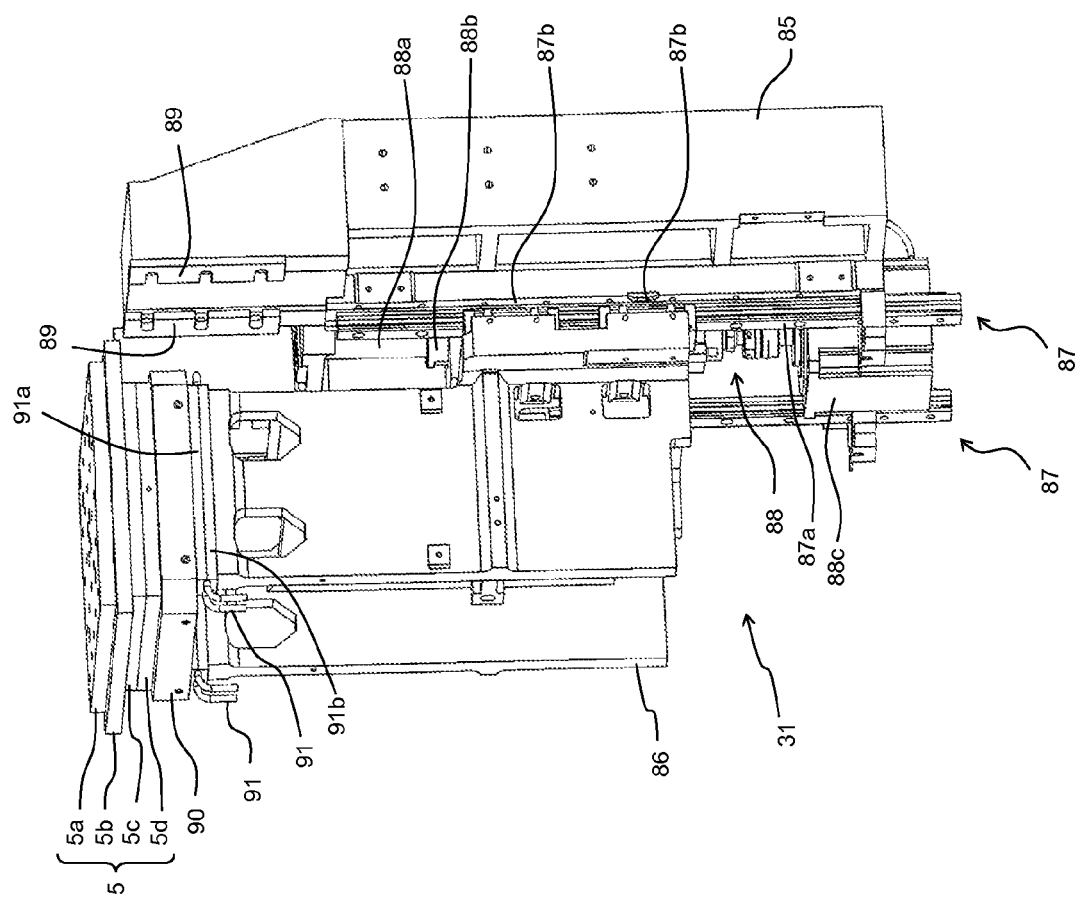
FIG. 7 is a perspective view of the driving mechanism 31 and the molding table 5 cut out from FIG. 5.
Figure 8:
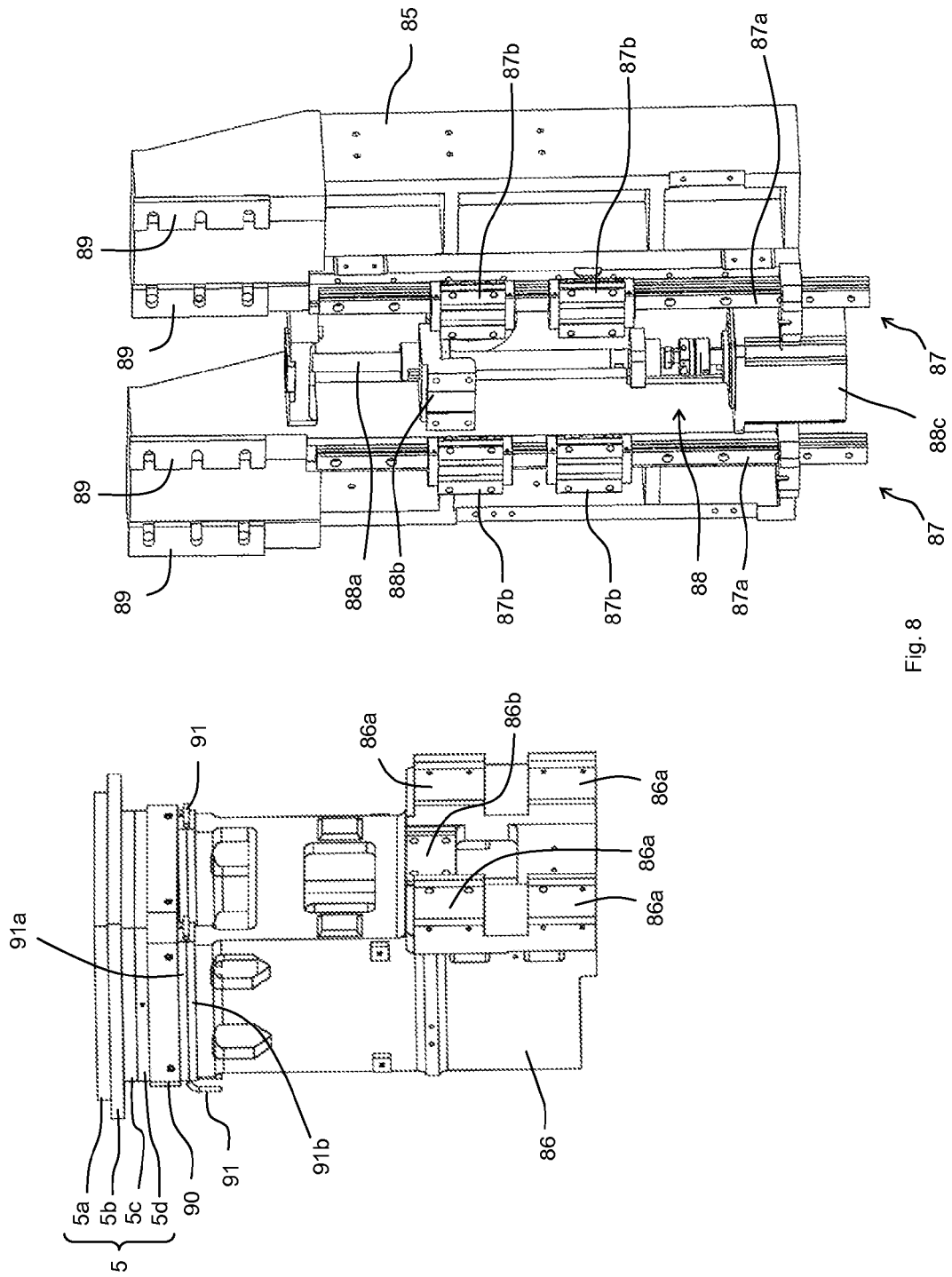
FIG. 8 is a perspective view showing the slide base 86 of FIG. 6 taken out from the guide base 85.
Figure 11:
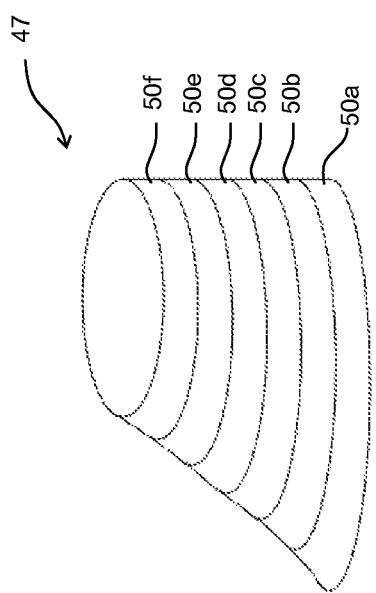
FIG. 11 is a perspective view of the molded product 47 obtained by laminating the sintered layers 50.

As shown in FIGS. 5 to 8, the powder retaining wall is fixed onto the guide base 85 via the connecting member 89. In addition, as shown in FIGS. 7 to 8, the slide mechanism 87 comprises a rail 87a, and a slide member 87b capable of sliding along the rail 87a. Here, the screw feeding mechanism 88 comprises a screw shaft 88a, a nut member 88b screwed to the screw shaft 88a, and a motor 88c which rotates the screw shaft 88a. As shown in FIG. 8, four slide members 87b are fixed onto the fixing member 86a of the slide base 86, and the nut member 88b is fixed onto the fixing member 86b of the slide base 86. When the nut member 88b is screwed in a vertical direction due to the rotation by the motor 88c, the slide base 86 moves in a vertical direction, being guided by the slide mechanism 87. Accordingly, the molding table 5 moves vertically.

As shown in FIGS. 8 to 9, the molding table 5 comprises a top plate 5a and three supporting plates 5b, 5c, and 5d. A heater 92 capable of heating the top plate 5a is provided in between the top plate 5a and the supporting plate 5b arranged adjacently to the top plate 5a. In addition, a cooler 93 capable of cooling the top plate 5a is provided in between the two supporting plates 5c and 5d, the two supporting plates being provided below the supporting plate 5b. The molding table 5 is structured so that the temperature of the molding table 5 can be controlled with the heater 92 and the cooler 93. The heater 92 and the cooler 93 structure the "temperature control section" mentioned in the Claims. Here, in the embodiment shown in FIG. 9, the cooler 93 is structured by sandwiching the tube material (pipe) with the supporting plates 5c and 5d. The cooler 93 can also be structured by forming a pipe hole in one of or both of the supporting plates 5c and 5d and combining the supporting plates 5c and 5d, thereby forming the cooling pipe directly onto the supporting plates 5c and 5d.

In the upper portion of the slide base 86, a pair of beam-shaped fixing section 86c is provided. On the fixing section 86c, the thermostatic section 91 is provided. Here, the temperature of the thermostatic section 91 is maintained substantially constant. In one example, the thermostatic section 91 is structured with a pipe and a medium flowing in the pipe, the medium having substantially constant temperature (for example, water). As shown in FIG. 9, a pair of supporting plates 91a and 91b sandwich the pipe structuring the thermostatic section 91 so as to support the pipe. A heat insulating plate 90 is provided in between the thermostatic section 91 and the molding table 5. The heat insulating plate 90 allows suppression of the heat transfer from the molding table 5 to the thermostatic section 91, thereby achieving effective heating and cooling of the molding table 5. Here, in a similar manner as the cooler 93, the thermostatic section is structured by sandwiching the pipe with the supporting plates 91a and 91b in the embodiment. The thermostatic section 91 can also be structured by forming a pipe hole in one of or both of the supporting plates 91a and 91b (plate materials) and combining the supporting plates 91a and 91b, thereby forming the pipe directly onto the supporting plates 91a and 91b.

Next, the inert gas supplying system to supply the inert gas into the chamber 1 and the fume discharging system to discharge the fume from the chamber 1 are explained.

The inert gas supplying system to supply the inert gas into the chamber 1 is connected with the inert gas supplying apparatus 15 and the fume collector 19. The inert gas supplying apparatus 15 has a function to supply the inert gas, and is a gas cylinder containing inert gas, for example. The fume collector 19 comprises duct boxes 21 and 23 provided at its upper stream side and its lower stream side respectively. The gas discharged from the chamber 1 (inert gas containing fume) is sent to the fume collector 19 through the duct box 21. Then, fume is removed in the fume collector 19, and the cleaned inert gas is sent to the chamber 1 through the fume duct box 23. According to such constitution, the inert gas can be recycled.

As shown in FIG. 1, the inert gas supplying system is connected with the upper supplying opening 1b of the chamber 1, the inert gas supplying space 17d of the adhesion preventing section 17, and the elongated member 9l. The inert gas is supplied into the molding space 1d of the chamber 1 through the upper supplying opening 1b. The inert gas supplied into the elongated member 9l is discharged onto the molding region R through the opening.

In the present embodiment, the inert gas from the fume collector 19 is sent to the upper supplying opening 1b, and the inert gas from the inert gas supplying apparatus 15 is supplied to the inert gas supplying space 17d and to the elongated member 9l. Although there is a possibility that the inert gas from the fume collector 19 contains residual fume, the constitution of the present embodiment does not permit the inert gas from the fume collector 19 be supplied into the space which requires especially high cleanliness (clean space 17f and the space at the periphery of the molding region R). Accordingly, the effect of the residual fume can be minimized.

As shown in FIG. 1, the fume discharging system to discharge the fume from the chamber 1 is connected with the upper discharging opening 1c of chamber 1, the fume suction sections 11fs and 11rs of the recoater head 11, and the elongated member 9r. Since the inert gas containing the fume in the molding space 1d of the chamber 1 is discharged through the upper discharging opening 1c, a flow of inert gas flowing from the upper supplying opening 1b towards the upper discharging opening 1c is formed in the molding space 1d. The fume suction sections 11fs and 11rs of the recoater head 11 can suction the fume generated in the molding region R when the recoater head 11 passes over the molding region R. Here, the inert gas containing the fume is discharged out of the chamber 1 through the opening of the elongated member 9r. The fume discharging system is connected with the fume collector 19 through the duct box 21, and the inert gas after removal of the fume by the fume collector 19 is recycled.

Next, the lamination molding method using the afore-mentioned lamination molding apparatus will be explained.

Here, a case where the molded product 47 having the three-dimensional profile as shown in FIG. 10A is formed by lamination molding is taken as an example for the explanation.

First, as shown in FIGS. 10B to 10C, a molded product 47 having the desired three-dimensional profile is molded using a computer, thereby obtaining a model 48 of the molded product. Then the model 48 of the molded product is sliced by a horizontal plane with a predetermined unit height, thereby forming sliced layers of 49a, 49b, . . . 49f. Subsequently, as shown in FIGS. 10 to 13, the material powder layer 8 is irradiated with the laser beam L so as to selectively sinter the material powder, thereby forming the sintered layers of 50a, 50b, . . . 50f having the profile corresponding to the sliced layers of 49a, 49b, . . . 49f respectively. The sintered layers are also fused with each other, thereby forming the molded product 47. The region surrounded by the outline profile of each of the sliced layers of 49a, 49b, . . . 49f is the region to be irradiated with the laser beam L, sliced layers of 45a, 45b, . . . 45f (hereinafter referred to as irradiation region). The sliced layers, sintered layers, and irradiation region are also referred to as sliced layers 49, sintered layers 50, and irradiation region 45, respectively.

As described, the molded product 47 can be formed by repeating selective sintering of the material powder of the material powder layer 8 in the irradiation region 45. This is accomplished by irradiating the irradiation region 45 with the laser beam L. Here, the irradiation region 45 is surrounded by the outline profile of each of the sliced layers 49 of the model 48 of the molded product Next, the method for forming the sintered layers 50 will be explained in detail.

First, the height of the molding table 5 is adjusted to an adequate position while the molding plate 7 is mounted on the molding table 5. Then, the heater 92 built in the molding table 5 is operated so that the temperature of the molding table 5 is raised to an adequate temperature (approximately 50 to 150° C., depending on the material). Here, the cooler 93 is not operated in order to raise the temperature of the molding table 5 quickly. In addition, a medium having a substantially constant temperature is continuously flowing through the pipe structuring the thermostatic section 91, thereby maintaining the temperature of the thermostatic section 91 at a substantially constant temperature.

In such condition, the recoater head 11, having the material holding section 11a filled with the material powder, is moved from the left side to the right side of the molding region R (in the direction shown by the arrow B in FIG. 1). Accordingly, the first layer of the material powder layer 8 is formed on the molding table 5.

Figure 12:
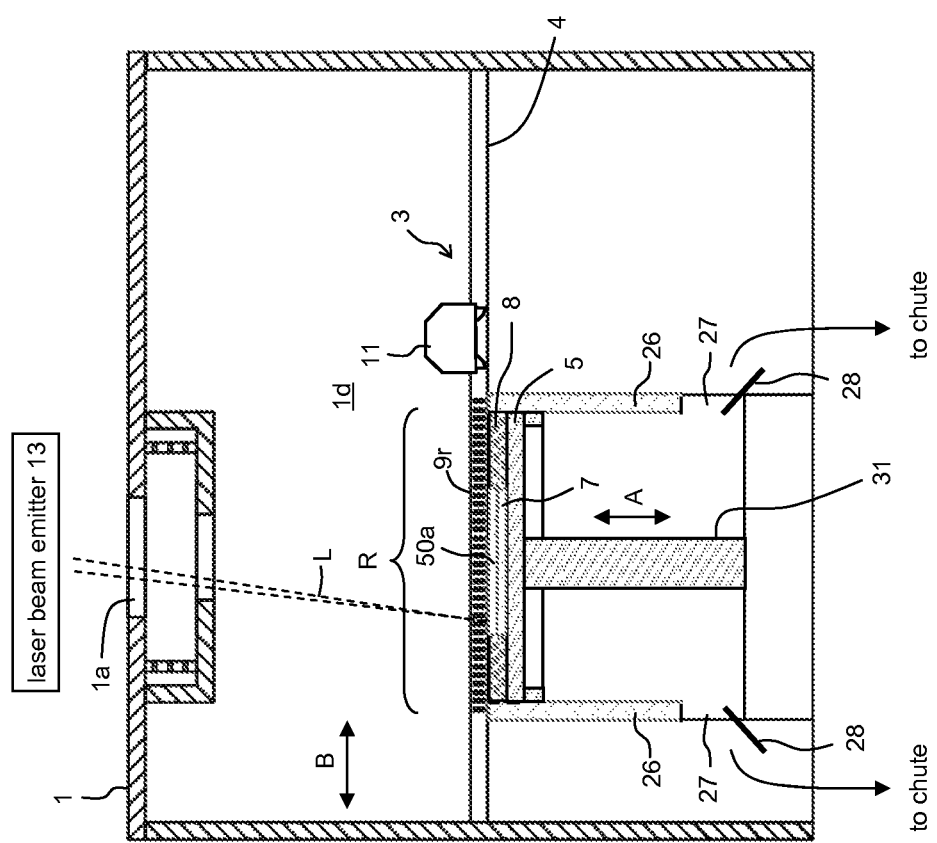
FIG. 12 is an explanatory drawing showing the lamination molding method which uses the lamination molding apparatus according to one embodiment of the present invention.

Subsequently, a prescribed portion of the material powder layer 8 is irradiated with the laser beam L, thereby sintering the portion of the material powder layer 8 irradiated with the laser beam. Accordingly, the first sintered layer 50a is obtained as shown in FIG. 12.

Next, the height of the molding table 5 is descended by the thickness of one layer of the material powder layer 8, followed by moving of the recoater head 11 from the right side to the left side of the molding region R. Accordingly, the second material powder layer 8 is formed on the molding table 5 so as to cover the sintered layer 50a.

Figure 13:
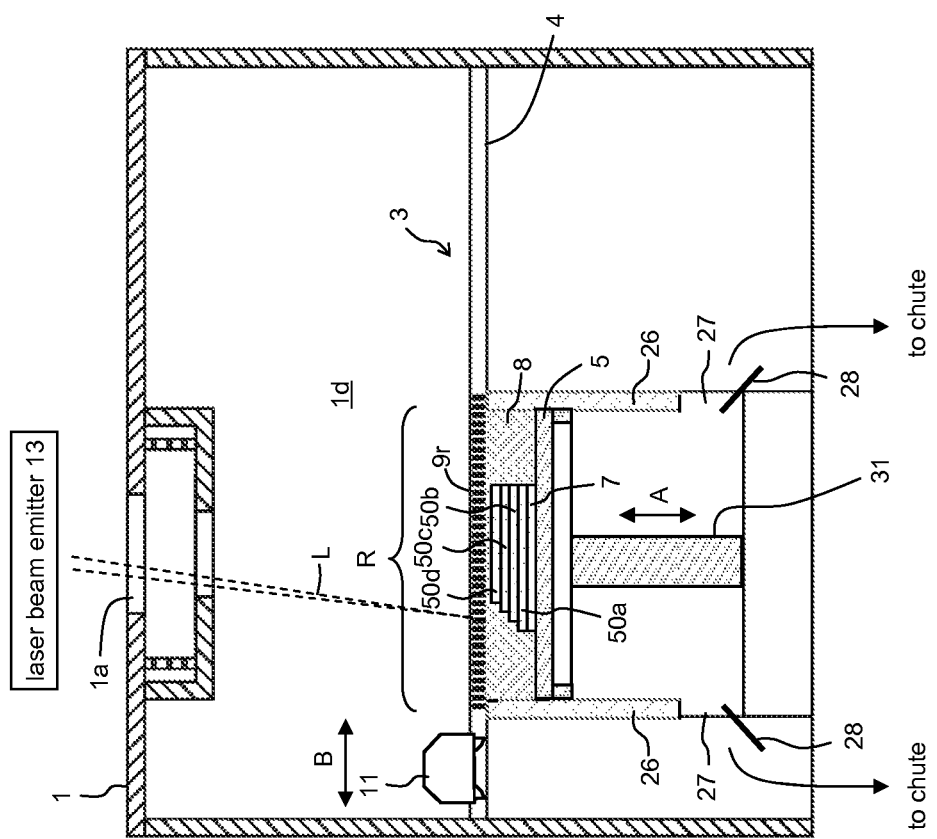
FIG. 13 is an explanatory drawing showing the lamination molding method which uses the lamination molding apparatus according to one embodiment of the present invention.

Subsequently, in a similar manner as described, the prescribed portion of the material powder layer 8 is irradiated with the laser beam L, thereby sintering the portion of the material powder layer 8 irradiated with the laser beam. Accordingly, the second sintered layer 50b is obtained as shown in FIG. 13.

By repeating the afore-mentioned procedures, the third sintered layer 50c, the fourth sintered layer 50d, and the sintered layers thereafter are formed. The neighboring sintered layers are firmly fixed with each other.

After the lamination molding is completed, the operation of the heater 92 is terminated, and the cooler 93 is operated to lower the temperature of the molding table 5. In the present embodiment, the thermostatic section 91 is provided in between the slide base 86 and the molding table 5. Therefore, when the heat generated by the heater 92 reaches the thermostatic section 91, such heat is removed by the thermostatic section 91. Accordingly, the heat from the heater 92 is hardly transferred to the slide base 86, or is not transferred to the slide base 86 at all. Therefore, even when the lamination molding is performed for several tens of hours, the slide base 86 is hardly heated by the heat of the molding table 5, or is not heated by the heat of the molding table 5 at all. Thus, when the cooler 93 is operated, the temperature of the molding table 5 drops rapidly. On the other hand, in a case where the thermostatic section 91 is not provided as in the conventional techniques, a large amount of heat is stored in the slide base 86, and thus requires a long time to cool down the molding table 5 when the cooler 93 is operated. As a result, the time required to take out the molded product becomes long, resulting in decrease in productivity. In addition, since the thermostatic section 91 can suppress the amount of heat flowing into the driving mechanism 31, the thermal deformation of the driving mechanism 31 can be suppressed, thereby improving the accuracy of the lamination molding.

In addition, the structure of the present embodiment comprises the slide base 86 to move the molding table 5 and to reserve heat conveyed from the molding table 5; and the guide base 85 to support the molding table 5 through the intermediary of the slide base 86, the slide mechanism 87, and the screw feeding mechanism 88. Accordingly, the degree of the thermal displacement of the slide base 86 in the moving direction is moderate compared with the degree of the temperature change of the thermostatic section 91. Thus, it takes time for temperature change of the thermostatic section 91 to reach the guide base 85. Therefore, regarding the temperature change of the thermostatic section 91 which is within a narrow range, the speed of the displacement of the slide base 86 in the moving direction during the time frame until the maximum displacement of the slide base 86 occur in the moving direction would be slow compared with the speed of the temperature change of the thermostatic section 91. As a result, accuracy in positioning is affected less, achieving suppression in the margin of error. Accordingly, since the speed of displacement is slow and the change in displacement condition is moderate and stable, accuracy in positioning can be improved by correcting the margin of error during positional controlling.

In the present embodiment, the thermostatic section 91 is provided in between the molding table 5 and the slide base 86. Here, the thermostatic section 91 can be provided at a different location, or an additional thermostatic section 91 can be provided at a different location. As shown in FIG. 5, when the molding table 5 is descended to a certain degree, a large amount of the material powder is contained in the space surrounded by the powder retaining wall 26. Accordingly, when the material powder is heated by the molding table 5 or by the laser beam L, the heat from the material powder would reach the guide base 85 via the powder retaining wall 26 and the connecting member 89, as shown in FIGS. 6 to 8. This would result in thermal deformation of the guide base 85. In order to suppress the thermal deformation of the guide base 85 due to the heat inflow through such channel, a thermostatic section having its temperature maintained at a substantially constant temperature can be provided to the guide base 85 or to the connecting member 89. Specifically, the thermostatic section can be structured by providing a pipe to the guide base 85 or to the connecting member 89, and allowing a medium having a substantially constant temperature to flow through the pipe continuously. Here, the connecting member 89 is not essential in this embodiment, and the guide base 85 can be directly connected with the powder retaining wall 26. In such case, the thermostatic section can be provided on the guide base 85.

In a case where the thermostatic section is provided on the guide base 85, it is preferable to provide the thermostatic section at a position neighboring the powder retaining wall 26, in order to minimize the effect of the heat.

Here, the thermostatic section can be provided at an arbitrary position in the driving mechanism 31, on the slide base 86 for example.

EXPLANATION OF SYMBOLS

1: chamber
3: powder layer forming apparatus
5: molding table
8: material powder layer
11: recoater head
13: laser beam emitter
17: fume adhesion preventing section
26: powder retaining wall
27: powder discharging section
28: chute guide
29: chute
31: driving mechanism
42: laser source
43*a*, 43*b*: galvanometer scanner
44: condensing lens
45: irradiation region
47: molded product
48: model of molded product
49: sliced layer
50: sintered layer
85: guide base
86: slide base
87: slide mechanism
88: screw feeding mechanism
89: connecting member
90: heat insulating plate
91: thermostatic section
L: laser beam Although various exemplary embodiments have been shown and described, the invention is not limited to the embodiments shown. Therefore, the scope of the invention is intended to be limited solely by the scope of the claims that follow.

What is claimed is:

1. A lamination molding apparatus, comprising:
    a chamber covering a desired molding region, the chamber being filled with an inert gas of a predetermined concentration; and
    a molding table positioned in the molding region, the molding table being configured to be capable of being moved vertically by a driving mechanism; wherein
    the molding table is configured to be temperature-controllable and comprises a top plate and a temperature control section provided below the top plate, the temperature control section being capable of controlling a temperature of the top plate;
    the temperature control section comprises a heater being capable of heating the top plate and a cooler being capable of cooling the top plate; and
    a thermostatic section is positioned in between the molding table and the driving mechanism or in the driving mechanism, temperature of the thermostatic section being maintained substantially constant such that thermal deformation of the driving mechanism due to heat from the molding table is suppressed, wherein the thermostatic section is structured with a pipe, and a medium flowing through the pipe, the medium having a substantially constant temperature.

2. The lamination molding apparatus of claim 1, wherein the driving mechanism comprises a guide base and a slide base capable of moving vertically with respect to the guide base, the slide base being positioned below the molding table; and
    the thermostatic section is provided in between the molding table and the slide base.

3. The lamination molding apparatus of claim 2, wherein the thermostatic section is positioned in between the temperature control section and the slide base.

4. The lamination molding apparatus of claim 3, wherein the heater is positioned below the top plate; the cooler is positioned below the heater; and
    the thermostatic section is positioned below the cooler.

5. The lamination molding apparatus of claim 2, wherein a heat insulating plate is positioned in between the thermostatic section and the molding table.

6. The lamination molding apparatus of claim 1, further comprising:
    a powder retaining wall surrounding the molding table and maintaining a material powder to be supplied onto the molding table;

wherein the driving mechanism comprises a guide base and a slide base capable of moving vertically with respect to the guide base, the slide base is positioned below the molding table;

the guide base is connected directly to the powder retaining wall or is connected to the powder retaining wall via a connecting member; and the thermostatic section is positioned next to the guide base or to the connecting member.

* * * * *